(No Model.) 2 Sheets—Sheet 1.
W. E. LINDSLEY.
FILTERING DEVICE.
No. 312,735. Patented Feb. 24, 1885.
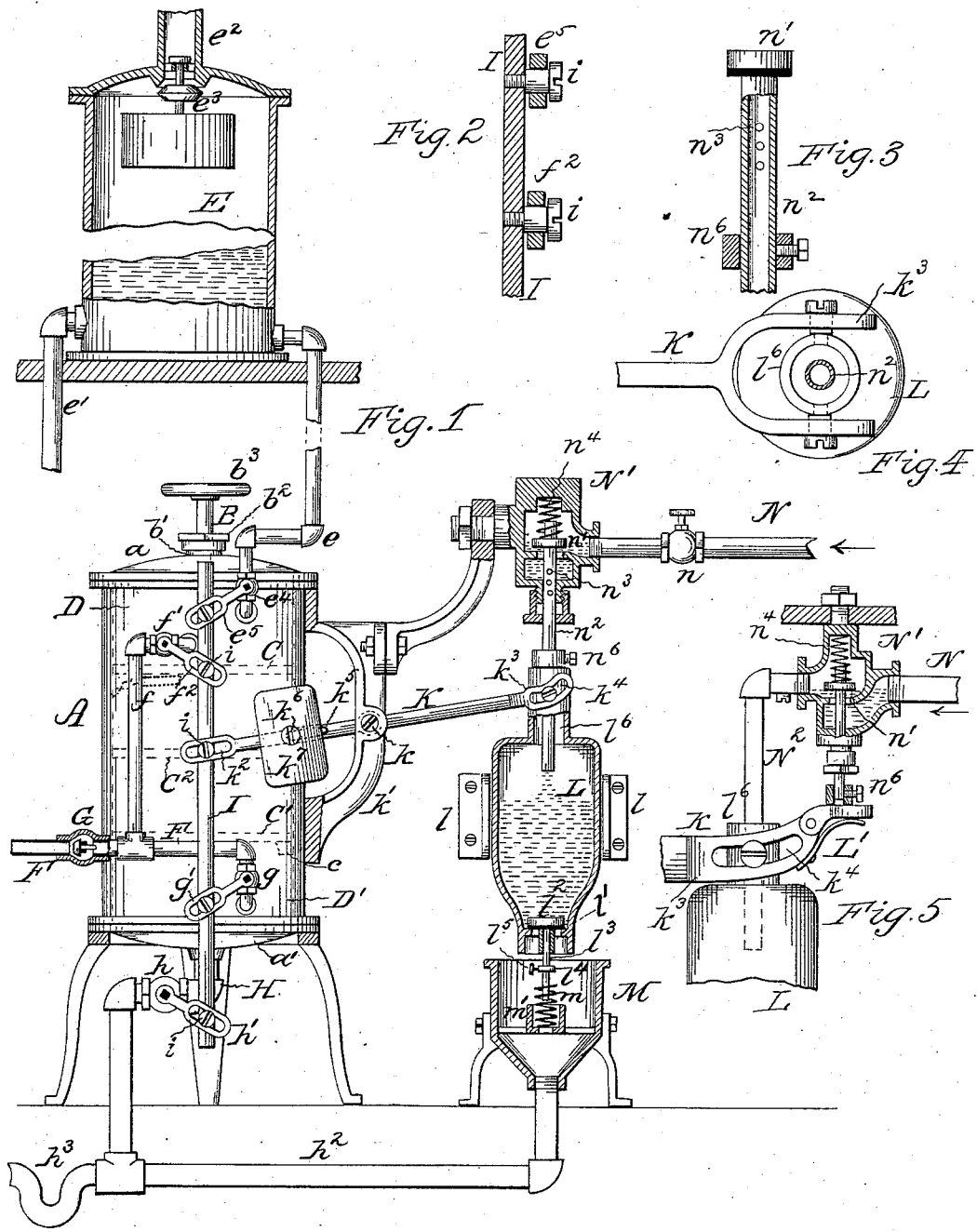
WITNESSES:
S. Ohler
C. W. Williams
INVENTOR,
Wm. E. Lindsley
By S. J. Van Stavoren
ATTORNEY

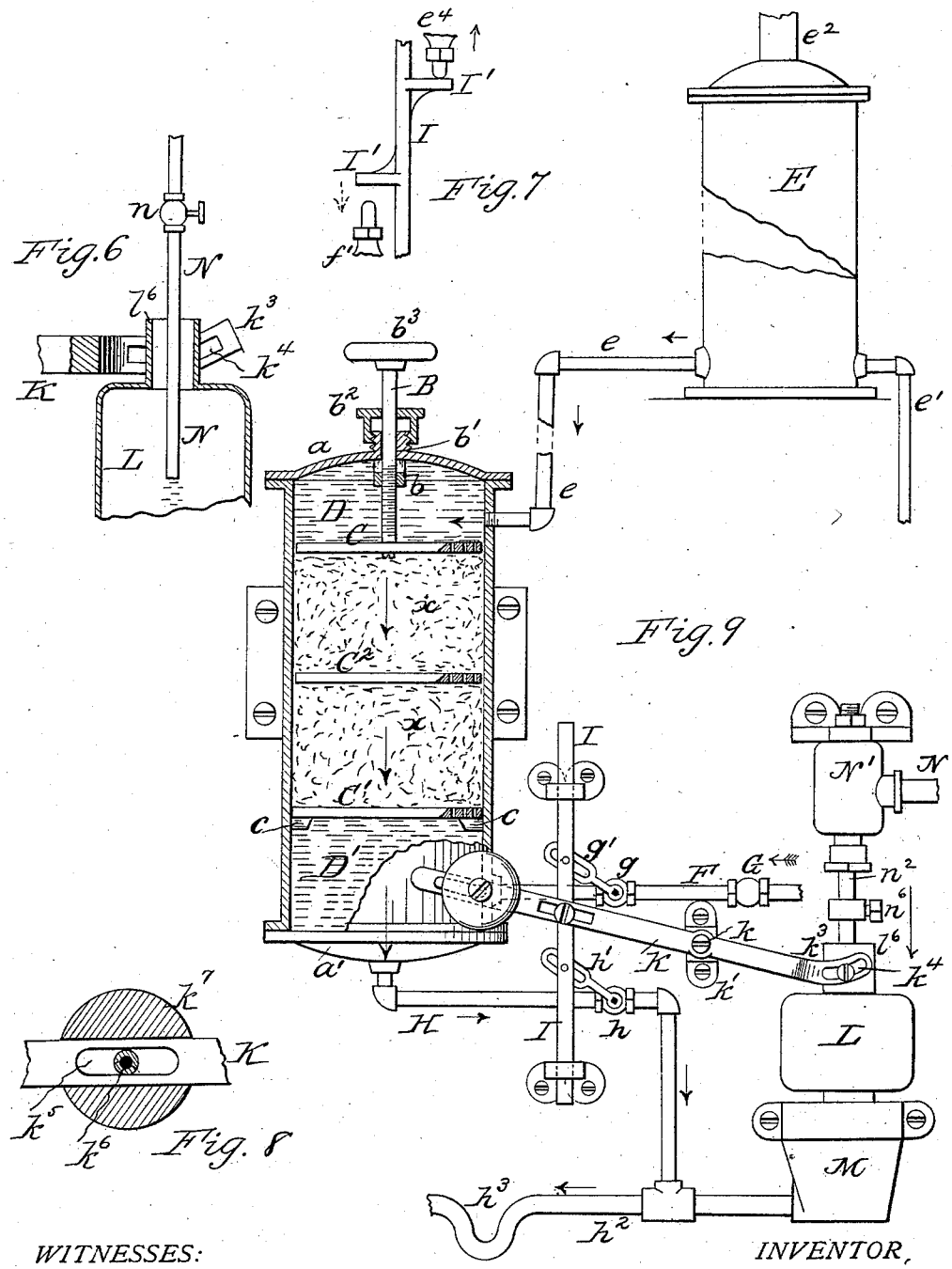

UNITED STATES PATENT OFFICE.

WILLIAM E. LINDSLEY, OF PHILADELPHIA, PENNSYLVANIA.

FILTERING DEVICE.

SPECIFICATION forming part of Letters Patent No. 312,735, dated February 24, 1885.

Application filed March 15, 1884. (No model.)

*To all whom it may concern:*

Be it known that I, WILLIAM E. LINDSLEY, a citizen of the United States, residing at Philadelphia, in the county of Philadelphia and State of Pennsylvania, have invented certain new and useful Improvements in Filtering Devices, of which the following is a specification, reference being had therein to the accompanying drawings, wherein—

Figure 1 is a sectional view, partly in elevation, showing a filter, storage-reservoir for the filtered water, and appurtenances which act to cause an automatic cleansing of the filter. Figs. 2 and 3 are broken sections of detail parts, drawn to an enlarged scale. Fig. 4 is a like detail plan. Figs. 5 and 6 are elevations, partly sectional, showing detail modifications. Fig. 7 is a broken elevation of a further detail modification. Fig. 8 is a detail broken section; and Fig. 9 is an elevation, partly sectional, showing filter, storage-reservoir, and filter appurtenances for effecting the automatic cleansing of the filter with the use of filtered water.

My invention has relation to that form of filter which is provided with appurtenances for enabling it to automatically cleanse itself of the sediment or impurities accumulating therein; and it has for its objects to effect an automatic cleansing of the filter at predetermined intervals by changing the direction of the flow of the unfiltered liquid by means of devices which automatically operate independently of such flow and of the condition of the filter packing or defecating material; to provide the filter with a storage-reservoir for the filtered liquid or water; to use filtered water for cleansing the filter; and, finally, to provide simple, inexpensive, durable, and effective automatic appurtenances for changing the direction of the flow of water or liquid through the filter to effect the cleansing of the same.

My invention, accordingly, consists of the combination, construction, and arrangement of parts, as hereinafter described and claimed.

In the drawings, Fig. 1, A represents the filter-casing, which is shown resting in an upright position and supported upon a stand; but, if desired, it may be otherwise arranged and sustained, as indicated in Fig. 9. It has flange-bolted top and bottom plates, $a$ and $a'$, respectively. The top plate, $a$, is provided with a cross-bar or other threaded support, $b$, for screw B, one end of which passes upwardly through a central opening, $b'$, in said top, and the other or lower end has a perforated disk or diaphragm, C, swiveled thereto in any suitable manner, so that said screw can turn independently of the disk. The latter is located within the casing A a short distance below the top plate, $a$, to provide for an upper casing-chamber, D.

At the opening $b'$ is a stuffing-box, $b^2$, for preventing escape of water from the filter, and screw B is provided with a turning-wheel, lever, or other suitable device, $b^3$.

Above the bottom plate, $a'$, so as to provide a lower casing-chamber, D', is another perforated diaphragm or disk, C', which is supported upon lugs $c\ c$, formed on or secured to the inner casing-wall. This disk rests loosely upon these lugs, so as to be removable therefrom and from the casing, for effecting easy and quick renewal of the defecating material. If desired, however, said disk may be otherwise maintained, or arranged in any desired or suitable manner.

Between the disks C and C' is the filtering packing or defecating medium $x$, of any suitable or desired kind, and it is divided into two parts by a loose perforated diaphragm or disk, $C^2$.

By regulating the adjustment of screw B the filtering medium $x$ is compressed or packed to any desired degree, or it may be loosely confined or held in an unpacked condition by removing the screw-pressure therefrom.

A filter constructed as described has an upper and a lower chamber and an intervening packing or defecating material which may be subjected to different degrees of pressure, or be confined in a loose or uncompressed condition, as desired.

From chamber D leads a pipe, $e$, connecting with a reservoir, E, in which the filtered water gradually accumulates to provide a storage or supply of pure water. This storage-reservoir has an outlet-pipe, $e'$, which is designed to connect with the service-pipes of the house or building furnished with the filtering devices, or it may be otherwise connected, as desired. Reservoir E may also have an air-pipe, $e^2$, provided with a float-valve, $e^3$, which is raised to seal pipe $e^2$ whenever the accumulation of pure water in the reservoir reaches and floats said valve, thereby preventing overflowing of the water from the reservoir, and when the former is drawn off from the latter said valve drops by gravity to unseal pipe $e^2$ and admit air to the reservoir, to facilitate the outflow of water therefrom. The pipe $e$ has preferably a quick-opening valve, $e^4$, the stem of which is provided with a slotted handle or lever, $e^5$.

From chamber D leads another pipe, $f$, having a quick-opening valve, $f'$, the stem of which has a slotted lever or handle, $f^2$. This pipe connects with the water-supply or inlet pipe F, terminating in or leading into chamber D'. The water-pipe F is provided with a preferably slow-opening cock, $g$, the stem of which has a slotted handle or lever, $g'$, and also with a check-valve, G, for preventing backflow from the storage-reservoir whenever its water-pressure is greater than that of the street-main or supply-pipe F. The bottom plate, $a'$, has an outlet-pipe, H, having a valve, $h$, with slotted handle or stem $h'$. This pipe leads to a waste-pipe, $h^2$, which, when connected to a sewer or other drain pipe, is then provided with a trap, $h^3$, for preventing admission of sewer-gas to the filter.

The slotted valve-handles above described are connected, as shown, to and support a bar, I, by means of screws $i$, which pass loosely through the slots in the handles and screw into said bar, as more plainly illustrated in Fig. 2. This bar, therefore, needs no special bearings or guides, and as it is raised or lowered the screws $i$ travel in the slots of said handles and move the latter to open or close their respective valves, as hereinafter described.

K represents a lever, pivoted at $k$ to a bracket, $k'$, which is secured to the casing A, as shown, or may be otherwise disposed of, as desired. This lever has a slotted end, $k^2$, which engages with rod I, as illustrated. The opposite end of lever K is provided with a yoke, $k^3$, having curved or other suitably-configured slots, $k^4$, from which is pivotally suspended a vessel or receptacle, L, having a vertical movement between the guides $l\ l$. The lever K is also provided with a slot, $k^5$, which in Fig. 1 is shown located between bar I and pivotal point $k$. This slot forms a bearing for a pin or axis, $k^6$, of a shifting or moving counterbalance, $k^7$, the detail construction of which is more plainly shown in Fig. 8. As lever K is tilted the weight $k^7$ shifts its position thereon or moves to and from the pivotal point $k$, for a purpose to be hereinafter described. The bottom or outlet $l'$ of vessel L is provided with a downwardly-closing valve, $l^2$, the stem $l^3$ of which has a collar, $l^4$, and adjusting or set screw $l^5$. This collar strikes against a spring, $m$, held in a pocket, $m'$, attached to a flaring or funnel-shaped receiver, M, which has connection with the waste-pipe $h^2$, as shown.

N represents another supply-pipe or a branch of pipe F, and it has a cock, $n$, for regulating the volume or flow of water passing therethrough. Said pipe N leads to a valve-casing, N', provided with a valve, $n'$, having a tubular stem, $n^2$, which has lateral perforations $n^3$. The stem $n^2$ leads into the neck or inlet opening $l^6$ of vessel L, as indicated. Valve $n'$ is closed by a spring, $n^4$, and upon its stem $n^2$ is an adjustable collar, $n^6$, against which the top edge of the vessel L strikes when raised to elevate or open valve $n'$. The bar I is so connected to the slotted levers of valves $e^4$, $f'$, $g$, and $h$ that when depressed or in the position shown in Fig. 1 it opens valves $e^4$ and $g$, and closes the valves $f'$ and $h$. The water from pipe F then passes into the chamber D' of the filter; thence through the filtering material $x$ to chamber D, and through pipe $e$ to storage-reservoir E, to provide an upward filtration. When, however, the bar I is elevated, the valves $e^4$ and $g$ are closed, and the cocks $f'$ and $h$ are opened. The water in pipe F then flows through pipe $f$ to chamber D, and as the valve $e^4$ is then closed such water cannot enter the storage-reservoir, but finds its way down through the filter to wash or cleanse it and its defecating material of any accumulated impurities, which then pass out of pipe H to waste-pipe $h^2$. These movements of bar I and of said valves effect an automatic cleansing of the filter by a downward flow of water through it; but, if desired, a downward filtration may be substituted for the upward filtration above described, in which case the cleansing will be effected by an upward flow, and the opening and closing of said valves will be the reverse of that above set forth.

To cause bar I to automatically move up and down to open and close said valves and change the direction of the flow through the filter, the lever K is automatically oscillated at intervals by the alternate variations in gravity of weight $k^7$ and of the full and empty vessel L, as follows: When bar I is down, as shown in Fig. 1, the filtration is going on, as described, the end $k^2$ of lever K is depressed, and its weight $k^7$ shifted away from lever-fulcrum $k$, and the vessel L is in its elevated position. As the latter ascended it impinged against collar $n^6$ and opened valve $n'$, to admit a flow of water to it from pipe N by way of casing N', perforations $n^3$, and hollow stem $n^2$. As the outlet $l^2$ of said vessel closes by gravity as it ascends, said vessel slowly fills until its gravity overbalances that of the weight $k^7$; but as the latter is so proportioned or is of such size and as it shifts its position farther away from lever-fulcrum $k$ as the empty vessel ascends, said weight overbalances vessel L to such extent that it is completely filled before its gravity is greater than that of weight $k^7$. When the vessel L is so filled or filled to such extent that it overbalances the weight $k^7$, the former falls and oscillates lever K, to raise its end $k^2$ and elevate bar I. The valve $n'$ then closes to cut off the flow from pipe N.

The valve $l^2$ is opened by its collar $l^4$ striking against the spring $m$, to admit the escape of water from vessel L. The valves $e^4$ and $g$ are closed to stop the filtration, the valves $f'$ and $h$ open to change the direction of flow through the filter for effecting its cleansing, and the weight $k^7$ is moved or shifted toward fulcrum $k$, so that it will not overbalance vessel L until it is emptied. When this result occurs, said weight $k^7$ tilts lever K to elevate vessel L and depress bar I, to effect a change or movement of the filter-valves for resuming the filtering operation. The cleansing operation for the filter continues until the vessel L is emptied, and the time required to empty it will depend upon the size of its outlet, which may be so proportioned to effect said result in any given time—say from ten to thirty or more minutes, as desired. During the time vessel L is filling, the filtration is going on and the pure water accumulates in reservoir E, from which it may be drawn off at any time when needed, so that the operation of cleansing the filter does not interfere with the supply for the service-pipes of the building provided with my invention, the reservoir E being designed to be of such size that it holds an ample supply of filtered water for all uses, domestic or otherwise. It will be noted that the automatic changing of the direction of the flow through the filter to alternately effect filtration and cleansing does not in any way depend upon such flow, nor upon the condition of the defecating material as to whether or not it contains more or less accumulated impurities. Such changing is entirely independent of the last-named conditions, and it follows that the reversing of the flow through the filter is positively and automatically obtained at the intervals determined upon when the proper adjustments for the filter automatic operating devices were made.

Instead of using the tubular stem-valve $n'$, a valve with solid stem may be employed, as shown in Fig. 5, in which case the valve-casing $N'$ is provided with an outlet-pipe, $N^2$, which enters the vessel L, as illustrated; and the lever K has a pivoted toe-piece, L', for opening valve $n'$. Again, instead of using movable or opening and closing valves $n'$, as indicated in Figs. 1 and 5, they may be dispensed with and the pipe N passed into vessel L, as shown in Fig. 6. In this case the cock $n$ is opened only so much that it will admit of a minute flow from said pipe, or that required for filling vessel L in the time given or set upon. The flow from pipe N will of course be continuous; but as it is small it will not interfere with the emptying of vessel L when it descends. So, too, instead of using ground or screw plugs for the filter-valves, (indicated in Figs. 1 and 9,) compression-cocks may be substituted, in which case the slotted handles shown will then be dispensed with, and in lieu thereof the bar I will have steps or fingers I' for opening said cocks, they being closed by the usual reacting springs.

In the form of filter above described I have shown the use of the water from the street-main or source of supply for cleansing the filter; but, if desired, and I prefer it, the filtered water in the reservoir E may be employed to effect the cleansing operation. To accomplish this result I arrange the operating devices for the filter as shown in Fig. 9, wherein the pipe $f$ and cock $f'$ are dispensed with. So, also, is the cock $e^4$ in pipe $e$, the cocks $g$ and $h$ in pipe F and outlet-pipe H alone being used. These are connected to the bar I, as shown, which, when depressed, opens cock $g$ and closes cock $h$. The water from pipe F then flows through the defecating material to be filtered and passes to reservoir E, backflow from the latter being prevented by the check-valve G in pipe F. When the bar I is raised, as indicated in Fig. 9, the valve $g$ is closed and cock $h$ opened, whereupon the water, or a portion of it, in reservoir E flows down through the filter, as indicated by the arrows, and washes out its impurities, which pass off by way of pipe $h^2$. The movements of bar I in this case are automatically made by the rising and falling of vessel L, as above described.

The advantage of using the filtered water for cleansing is, that no unfiltered water is admitted to the filter above its packing or defecating material, and such water cannot, therefore, gain access to reservoir E to foul its contents when the flow is reversed through the filter. For this reason the upper end of pipe $f$, Fig. 1, may be connected to the filter below the perforated plate C, if desired.

I do not herein confine myself to the position and configuration of the various parts shown, as it is evident they may be differently arranged and configured without departing from the spirit of my invention; neither do I limit myself to the particular form of filter and of reservoir, the latter being preferably made as shown.

In cases where the automatic operating devices herein described are not desired for effecting movement of bar I, it can be manually operated to produce the changes of flow through the filter.

When the form of supply-pipe N shown in Fig. 6 is used for vessel L, sand, shot, or other granulated material may be employed instead of the water-supply above described.

What I claim is—

1. A filter having chambers D D', inlet-pipe F, having check-valve G, cock $g$, and branch $f$, having cock $f'$, the pipe $e$, having cock $e^4$, pipe H, having cock $h$, and a single controlling sliding bar in gear with cocks $g$, $f'$, $e^4$, and $h$, substantially as shown and described.

2. A filter having a bottom chamber, D', provided with a valved wash-out pipe, H, and a valved inlet or water-supply pipe, F, and a top chamber, D, having an outlet-pipe, $e$, for the filtered water, in combination with a single controlling sliding bar in gear with the valves in said pipes, and operated by automatically-acting devices, substantially as shown and described.

3. A filter provided with automatically-operating devices for effecting a cleansing of the filter at predetermined intervals and independently of the direction of the flow of liquid through the filter or the hydrostatic pressure in the filter supply-pipe, substantially as shown and described.

4. A filter having a separate supply-pipe, automatically-operating devices for changing the direction of flow through the filter, and separate supply-pipe for said automatic devices, substantially as shown and described.

5. A filter provided with a bottom inlet-pipe, operating devices for changing the direction of the flow through the filter, and a separate supply-pipe independent of the filter for said devices, substantially as shown and described.

6. In combination, a filter, inlet and outlet pipes therefor, having valves connected to a single controlling operating-bar, an oscillating lever having at one end a bar or connection which is secured to the cocks of the filter and at its opposite end a suspended vessel, and a water-supply for the latter, substantially as shown and described.

7. In combination, a filter, an oscillating lever having at one end a bar or connection for engagement with the valves of the filter and a shifting weight or counter-balance, and at its other end a suspended vessel, and a water-supply for the latter, substantially as shown and described.

8. The combination of filter A, having valved inlet and outlet pipes, sliding bar I, pivoted lever, connecting devices between one end of said lever and the valves of said pipes, a suspended vessel at the opposite end of said lever, and means independent of the filter and its water-supply for raising and lowering said vessel and moving said lever, substantially as and for the purposes set forth.

9. The combination, with a filter having valved inlet and outlet pipes, of a pivoted lever having a shifting weight or counterpoise, connecting devices between one end of said lever and the valves of said pipes, a suspended vessel at the opposite end of said lever, and means for producing a descent of said vessel, substantially as and for the purpose set forth.

10. The combination of filter A, pipe $e$, inlet-pipe F, having cock $g$, and branch $f$, with cock $f'$, the outlet-pipe H, having cock $h$, lever K, bar I, shifting or movable weight $k^7$, and vessel L, with supply-pipe N, substantially as shown and described.

11. A filter provided with a valved waste-pipe at its bottom, a valved water-inlet pipe, and an outlet-pipe for the filtered water, a single controlling sliding bar in gear with the valves in said pipes, in combination with an automatically-acting pivoted lever and bucket or vessel in gear with said sliding bar, and a water-supply for said bucket, substantially as and for the purpose set forth.

12. A filter provided with a valved waste-pipe, a valved inlet-pipe for the unfiltered water, an outlet-pipe for the filtered water leading to a reservoir, a single controlling sliding bar in gear with the valves in said pipes, in combination with automatically-acting pivoted lever and bucket in gear with sliding bar, and a water-supply for said bucket, substantially as shown and described.

13. The combination, with filter A and its supply and outlet pipes, having suitable valves, of the bar I, lever K, shifting weight $k^7$, vessel L, having valve $l^2$, and receiver M, having pipe $h^2$, connected with the waste-pipe of the filter, substantially as shown and described.

In testimony whereof I affix my signature in presence of two witnesses.

WILLIAM E. LINDSLEY.

Witnesses:
S. J. VAN STAVOREN,
CHAS. F. VAN HORN.